United States Patent [19]
Moracz et al.

[11] 3,851,135
[45] Nov. 26, 1974

[54] ELECTRICAL DISCHARGE MACHINING PROCESS EMPLOYING BRASS ELECTRODE, SILICONE OIL DIELECTRIC, AND CONTROLLED VOLTAGE PULSES

[75] Inventors: Donald J. Moracz, Maple Heights; Edward J. Stachura, Lyndhurst, both of Ohio

[73] Assignee: TRW Inc., Cleveland, Ohio

[22] Filed: Nov. 9, 1973

[21] Appl. No.: 414,404

[52] U.S. Cl. ........... 219/69 M, 219/69 D, 219/69 E
[51] Int. Cl. ............................................. B23p 1/08
[58] Field of Search ..... 219/69 D, 69 P, 69 M, 69 E

[56] References Cited
UNITED STATES PATENTS 3,056,065  9/1962  Porterfield ........................ 219/69 P
3,334,210  8/1967  Williams et al. ................... 219/69 D
3,622,735  11/1971 Mainwaring ....................... 219/69 E

*Primary Examiner*—Bruce A. Reynolds
*Attorney, Agent, or Firm*—Hill, Gross, Simpson, Van Santen, Steadman, Chiara & Simpson

[57] ABSTRACT

Electrical discharge machining process in which the parameters are controlled to provide higher metal removal rates than heretofore considered possible, together with maintenance of good surface integrity. Specifically, the new process makes use of a brass electrode, a silicone oil dielectric, and a pulsating voltage between the electrode and the workpiece, the pulses of the voltage having a pulse duration ranging from 4 to 200 microseconds and an on time of from 20 to 80 percent of the period of such pulses.

7 Claims, 1 Drawing Figure

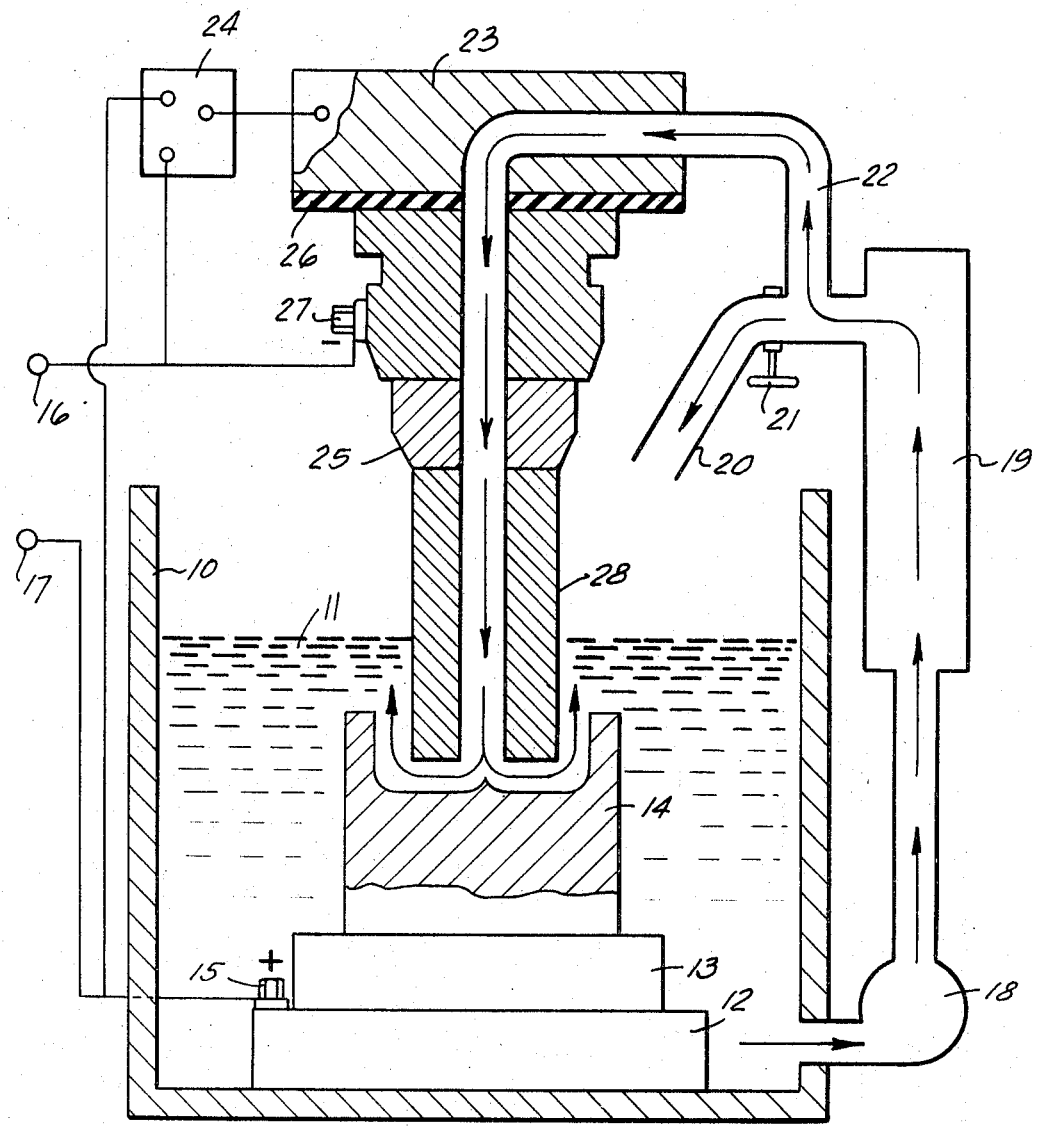

ELECTRICAL DISCHARGE MACHINING PROCESS EMPLOYING BRASS ELECTRODE, SILICONE OIL DIELECTRIC, AND CONTROLLED VOLTAGE PULSES

BACKGROUND OF THE INVENTION

1. Field of the Invention

This invention is in the field of electrical discharge machining processes wherein an electrode is advanced toward a workpiece in a hole drilling operation, and a dielectric liquid is forced through the electrode under positive pressure into the gap between the electrode and the workpiece where it is partially ionized and also serves to wash away the machined particles and to keep the workpiece cool.

2. Description of the Prior Art

Electrical discharge machining (EDM) is a fairly widely used method for producing holes, slots, or other cavities in electrically conductive material by means of controlled removal of material through melting or vaporization by high frequency electrical sparks. The spark discharge is produced by controlled pulsing of direct current between a positively charged workpiece and a negatively charged electrode. Typically, the end of the electrode and the workpiece is separated by a spark gap of 0.0005 to 0.020 inch and both are immersed in or flooded by a dielectric fluid. The dielectric in the gap is partially ionized under the pulsed application of a high voltage, thus enabling a spark discharge to pass between the tool and the workpiece. Each spark produces enough heat to melt or vaporize a small quantity of the workpiece, leaving a tiny pit or crater in the surface of the work.

Electrical discharge machining process has been applied effectively to the drilling of small diameter holes (0.100 inch or less) in conductive materials. With present techniques, however, a relatively slow machining rate is obtained. Current commercial practice involves machining rates which do not exceed 0.060 inch penetration per minute and are frequently less.

SUMMARY OF THE INVENTION

The present invention provides an optimum combination of electrical parameters, electrode material, dielectric medium, dielectric temperature, and dielectric pressure which has been found to improve machining rates substantially above the rates conventionally obtainable. With the process of the present invention, we have been able to achieve machining rates of about 0.4 inch penetration per minute, and even higher rates have been successfully demonstrated.

Specifically, we have found that much higher than normal machining rates can be achieved in an electrical discharge machining process by employing a silicone oil dielectric in combination with a brass electrode, and applying a pulsating voltage between the electrode and the workpiece, the pulses having a pulse duration ranging from 4 to 200 microseconds and an on time or duty cycle ranging from 20 to 80 percent of the period of said pulses. The preferred pulse duration frequency is from 5 to 10 microseconds. With the type of electrodes employed for small hole drilling, the peak current should be in the range of about 6-7 amperes, and the ionization voltage should be in the range of about 70-90 volts. It is important to keep the dielectric liquid under positive pressure as it issues from the electrode, and pressures of about 5 to 10 pounds per square inch have been found to be suitable.

BRIEF DESCRIPTION OF THE DRAWINGS

The single FIGURE of the drawings is a somewhat schematic representation of an improved electrical discharge machining assembly for use in the present invention, the size of the electrode being greatly exaggerated for purposes of clarity.

DESCRIPTION OF THE PREFERRED EMBODIMENTS

Referring to the drawings, reference numeral 10 has been applied to a tank in which a dielectric liquid 11 is received and circulated. Immersed within the dielectric liquid 11 is an insulating base 12 on which there is located an electrically conducting fixture 13. A workpiece 14 in which holes are to be drilled is mounted on the fixture 13 and is electrically connected to a source of positive voltage by means of a terminal 15 from a pulsating direct current source, the terminals of which are identified at reference numerals 15 and 16, respectively.

Dielectric fluid in the tank 10 is withdrawn by means of a pump 18 and circulated through a filter 19 in which metal particles and other contaminants are removed. The bulk of the filtered liquid is returned to the tank 10 by means of a line 20 under the control of a valve 21, while a small portion of the recirculated fluid is directed into a line 22 for passage through the electrode assembly. The latter includes a tool feeding device 23 which is under the control of a servo control 24 which is energized across the terminals 16 and 17. The tool feeding device 23 is connected to an electrode holder 25 and spaced therefrom by means of insulation 26. A terminal 27 electrically connects the electrode structure to the negative side of the power supply.

Mounted in the tool holder 25 is an electrode 28 which in the present invention consists of a brass tube typically having an outer diameter of about 0.020 inch and an inner diameter of 0.006 inch. A number of different types of brasses can be used as the material for the tube, such brasses usually containing from 60 to 80 percent copper and the balance zinc. Conventional free machining brass containing 70 percent copper and 30 percent zinc is very suitable.

The electrical discharge machine process is carried out in the usual fashion by applying a pulsating potential across the terminals 16 and 17, introducing the dielectric liquid under positive pressure through the electrode 28, and advancing the electrode 28 into the cavity of the workpiece 14 as drilling progresses.

There are a number of silicone oils which are commercially available and which have characteristics suitable for use in the process of the present invention. Generally speaking, such silicon oils should have a viscosity of not more than 40 centistokes at 100° F. and should have a minimum dielectric strength of 300 volts per inch. The physical properties of two suitable dielectric oils are given in the following table Dielectric Oil

|  | Dow Corning "DC 200" | "EDM 1025" |
|---|---|---|
| Specific gravity | 0.920 | 0.8334 |
| Flash point (°F.) | 275 | 290 |
| Viscosity at 100°F. |  |  |

Dielectric Oil-Continued

|  | Dow Corning "DC 200" | "EDM 1025" |
|---|---|---|
| (Centistokes) | 5.0 | 5.2 |
| Pour Point (°F.) | −85 | 10 |
| Dielectric Strength (V./mil) | 350 min. | 410 |

According to the supplier, Dow Corning, the "DC 200" is a clear dimethyl silicone liquid. The "EDM 1025" is a modified silicone fluid apparently containing some hydrocarbon oils, and is not as preferred as the substantially pure silicone "DC 200" oil.

With the types of electrodes used in the present invention, the peak current should be in the range of about 6 to 7 amperes, with an ionization voltage of from 70 to 90 volts. The pulse durations should be in the range from about 4 to 200 microseconds and preferably from 5 to 10 microseconds. Suitable on and off times are selected so that the pulse is on from 20 to 80 percent of the cycle. A particularly preferred pulsing program consists of applying pulses of 6 microseconds in duration with an equal off time (i.e., with a 50 percent duty cycle). The resulting pulse repetition frequency is 83.3 kilohertz.

While not as important as the electrical parameters and the choice of electrode materials and dielectric medium, the control of the temperature of the dielectric in the range of about 72° to 75°F. is also highly desirable. Suitable forward flushing through the electrode is achieved by using a dielectric pressure of from about 5 to 10 pounds per square inch with the types of electrodes described previously.

We have made numerous tests which confirm the fact that the combination of a brass electrode, silicone oil dielectric medium, and pulse repetition frequency, as correlated herein, provide substantial improvements in drilling rates. The following specific examples represent the results of some of those tests. For the purposes of these tests, the peak current was held to a value of 6 to 7 amperes, the dielectric pressure was 9 to 10 pounds per square inch, the ionization voltage was 80 volts, and the dielectric temperature was 72° to 75°F. The workpiece consisted of a metal piece 0.100 inch in thickness and holes of a diameter of 0.020 inch were drilled through the entire thickness. In Examples I through XX, the workpiece consisted of a nickel base alloy "IN 718."

EXAMPLE I

In this test, the electrode material was copper and the silicone oil was the aforementioned "DC 200." The pulses were of six microseconds in duration, at a duty cycle of 50 percent. It was found that under these conditions, a machining rate of 0.040 inch per minute was achieved.

EXAMPLE II

In this test, we employed the copper electrode and the same silicone oil as in Example I, with a pulse duration of six microseconds, but increased the duty cycle to 67 percent. Under these conditions, we found that the machining rate was 0.036 inch per minute.

EXAMPLE III

This test was conducted similarly to Example I, except that the on time was increased to 100 microseconds, at a duty cycle of 50 percent. The resulting machining rate was found to be 0.024 inch per minute.

EXAMPLE IV

The conditions of Example III were duplicated with the exception that the duty cycle was increased to 67 percent. It was found that the machining rate was 0.021 inch per minute.

EXAMPLE V

For this test, a brass electrode was used, and the same silicone oil ("DC 200") as in the preceding tests. Using a pulse duration of six microseconds and a duty cycle of 50 percent, it was found that the machining rate was 0.400 inch per minute, about ten times the rate achieved in Example I.

EXAMPLE VI

The conditions of Example V were duplicated except that the duty cycle was increased to 67 percent. It was found that the machining rate was 0.261 inch per minute.

EXAMPLE VII

In this test, the conditions of Example V were duplicated except that the pulse duration was extended to 100 microseconds, at a duty cycle of 50 percent. This test resulted in a machining rate of 0.261 inch per minute.

EXAMPLE VIII

The conditions of Example VII were duplicated except that the duty cycle was extended to 67 percent. Under these conditions, the machining rate was reduced to about 0.100 inch per minute.

EXAMPLE IX

In this test, a copper electrode was used in combination with the "EDM 1025" silicone oil. The pulse duration was 6 microseconds, at a duty cycle of 50 percent. The resulting machining rate was found to be 0.043 inch per minute.

EXAMPLE X

The same conditions as in Example IX were used, except that the duty cycle was increased to 67 percent. The resulting machining rate was found to be 0.057 inch per minute.

EXAMPLE XI

The same electrode and silicone oil were used as in Examples IX and X, but the pulse duration was increased to 100 microseconds, at a duty cycle of 50 percent. The resulting machining rate was found to be 0.034 inch per minute.

EXAMPLE XII

The conditions of Example XI were duplicated except that the duty cycle was increased to 67 percent. This resulted in a machining rate of 0.029 inch per minute.

EXAMPLE XIII

A brass electrode was employed, with the "EDM 1025" silicone oil. The pulse duration was six microseconds, at a duty cycle of 50 percent. The resulting machining rate was found to be 0.065 inch per minute.

EXAMPLE XIV

The conditions of Example XIII were reproduced, with the exception that the duty cycle was increased to 67 percent. The resulting machining rate was found to be 0.067 inch per minute.

EXAMPLE XV

The same electrode and silicone oil was used as in Examples XIII and XIV. The pulse duration was 100 microseconds, at a duty cycle of 50 percent. The machining rate was found to be 0.019 inch per minute.

EXAMPLE XVI

The duty cycle of Example XV was increased to 67 percent. It was found that the machining rate was raised to 0.030 inch per minute.

EXAMPLE XVII

For this test, we used a brass electrode and a hydrocarbon oil dielectric ("Texaco 499"). With a pulse duration of six microseconds and a duty cycle of 50 percent, a machining rate of 0.026 inch per minute was achieved.

EXAMPLE XVIII

Using the same conditions as Example XVII, but increasing the duty cycle to 67 percent changed the machining rate to 0.022 inch per minute.

EXAMPLE XIX

Using the brass electrode and hydrocarbon dielectric of the preceding two Examples, and using a pulse duration of 100 microseconds at a duty cycle of 50 percent resulted in a machining rate of 0.009 inch per minute.

EXAMPLE XX

The conditions of Example XIX were reproduced with the exception that the duty cycle was increased to 67 percent. This resulted in a machining rate of 0.008 inch per minute.

EXAMPLE XXI

The workpiece in this example was composed of stainless steel "410 SS." A brass electrode, a pure silicone oil dielectric ("DC 200"), 6 microsecond pulses and a duty cycle of 50 percent wre employed. The machining rate was determined to be 0.400 inch per minute.

EXAMPLE XXII

The conditions of Example XXI were repeated except that a modified silicone oil "EDM 1025" was substituted for the pure silicone oil as the dielectric. The machining rate was 0.162 inch, representing an improvement over conventional drilling rates, but being significantly less than that achieved in Example XXI.

It should be evident that various modifications can be made to the described embodiments without departing from the scope of the present invention.

We claim as our invention:

1. A method for electrical discharge machining of a workpiece which comprises positioning a brass electrode in closely spaced relation to the workpiece, injecting a silicone oil dielectric under positive pressure through said electrode and at said workpiece, and applying a pulsating voltage between said electrode and said workpiece, the pulses of said voltage having a pulse duration ranging from 4 to 200 microseconds and an on time of from 20 to 80 percent of the period of the pulses.

2. The method of claim 1 in which said pulse duration is from 5 to 10 microseconds.

3. The method of claim 1 in which the peak current is in the range from 6 to 7 amperes.

4. The method of claim 1 in which the ionization voltage is in the range from 70 to 90 volts.

5. The method of claim 1 in which said dielectric is under a pressure of from 5 to 10 pounds per square inch.

6. The method of claim 1 in which said pulse duration is from 5 to 10 microseconds, said peak current is in the range of from 6 to 7 amperes, and the dielectric is under a pressure of from 5 to 10 pounds per square inch.

7. A method for electrical discharge machining of a workpiece which comprises positioning an electrode in closely spaced relation to the workpiece, injecting a liquid dielectric under positive pressure through said electrode and at said workpiece, and applying pulses of electrical voltage between said electrode and said workpiece having a duration in the order of about from 4 to 200 microseconds and an on time of from 20 to 80 percent of the period of the pulses.

* * * * *